(No Model.)

I. C. WIGHTMAN.
MILK COOLER.

No. 248,123. Patented Oct. 11, 1881.

Attests

Inventor
Ira C. Wightman
By his atty

UNITED STATES PATENT OFFICE.

IRA C. WIGHTMAN, OF SEVERN VALLEY, ASSIGNOR TO DWIGHT FRANCIS WIGHTMAN, OF PUGHTOWN, PENNSYLVANIA.

MILK-COOLER.

SPECIFICATION forming part of Letters Patent No. 248,123, dated October 11, 1881.

Application filed July 11, 1881. (No model.)

*To all whom it may concern:*

Be it known that I, IRA C. WIGHTMAN, of Severn Valley, in the county of York, in the State of Pennsylvania, have invented an Improvement in Milk-Coolers, of which the following is a specification.

My invention relates to milk-coolers; and it consists in a water-tight box or tank in which is hung a metal vat, said vat being provided with flattened tubes open wholly at one end, but only at the top at the other end; further, in providing the vat with a cream-glass and means for securing said vat to the wooden tank or box, whereby said glass is exposed through an opening in the wooden tank, but the joint about said opening is made perfectly water-tight; further, in providing an ice-box at one end, in combination with tubes for feeding and discharging the cold water, and a pump to keep up the circulation of same, all of which is more fully set forth in the following specification, and shown in the accompanying drawings, which form part thereof.

The object of this invention is to provide a cream-inspecting glass to the vat in a cooler of this construction, so that the cream can be clearly seen without looking through a body of water, and to cause a more perfect circulation of the cold water through and around the milk in the vat.

Figure 1:
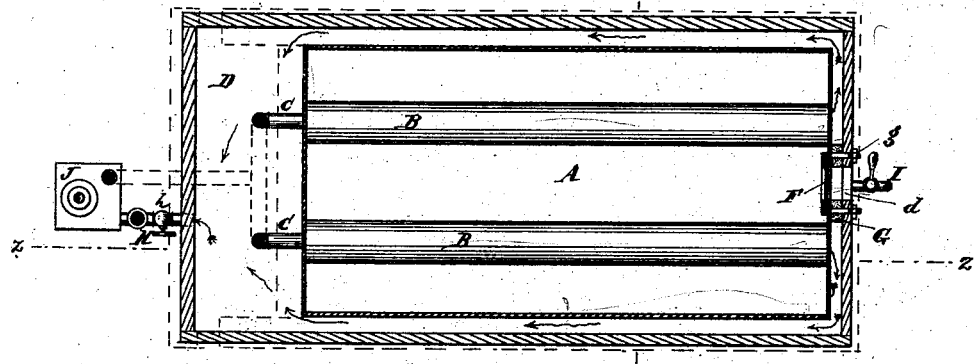
Figure 2:
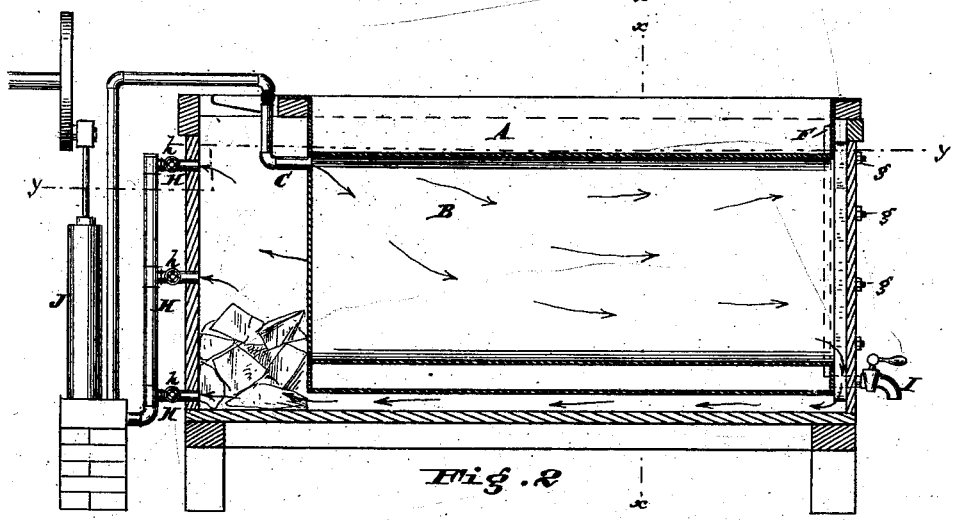
Figure 3:
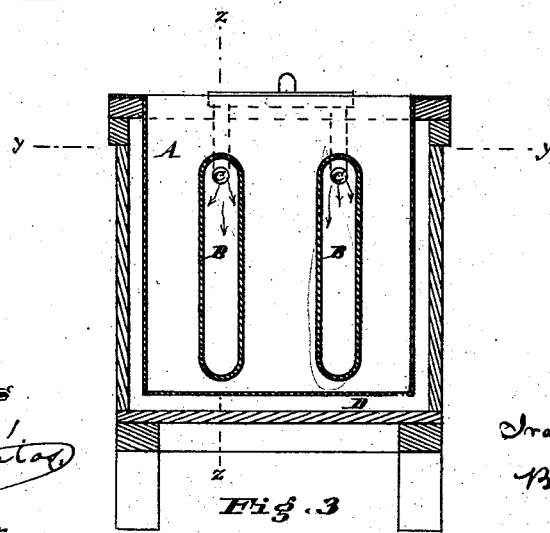

In the drawings, Figure 1 is a sectional plan of my improved milk-cooler on line $y\ y$. Fig. 2 is a sectional elevation of same on line $z\ z$. Fig. 3 is a cross-section of same on line $x\ x$.

D is the tank or water and ice box, and is provided at one end with a vertical slot, $d$.

Suspended in the tank D is the cream and milk vat A, which is provided with flattened tubes B, extending from one end to the other, and just clear of the bottom. One end of the tubes B is entirely open, and the other end is closed, and into the upper end of which the feed-pipes C enter. One end of this vat A is provided with a cream-glass, F, and said vat is bolted or otherwise secured to said tank D, as shown in Fig. 1. To effect this the cream-glass F in the vat A is brought to register with the slot $d$ of the tank D, and a packing, G, is arranged between said vat and tank and about said slot $d$ and cream-glass F, and they are then clamped together by bolts $g$, thereby leaving a space between the vat and tank for the circulation of the water. The tank is longer than the vat, and the space between the two is used as an ice-box.

H are the discharge-pipes, arranged at different levels, and are provided with valves $h$. These discharge-pipes H connect with the suction-port of a water-pump, J, and the discharge-port of same is connected with the feed-pipes C.

A tap or valve, I, opens from the vat A at the bottom and passes through the tank D, in which it is made water-tight.

The operation is as follows: Milk being placed in the vat A and water and ice in the tank D, the pump J is operated. The water in a cold condition is sucked from the tank by pipes H and forced into the pipes C, and thence into the top of the flattened tubes B, and is then discharged at the other end, where part passes between the vat and tank and passes back to its starting place after having passed between the sides and bottoms of the tank and vat, thereby cooling the milk perfectly. By this construction the water is forced to flow over every part of the vat, thereby obtaining the greatest cooling effect.

Having now described my invention, what I claim as new, and desire to secure by Letters Patent, is—

1. In a milk-cooler, a metal vat, A, provided with flattened tubes B, extending horizontally across the vat from end to end, said tubes being open wholly at one end, and provided with pipes C, to admit water into the other end, which is closed, substantially as and for the purpose specified.

2. In a milk-cooler, the tank D, in combination with the vat A, provided with tubes B, extending horizontally and entirely across the vat, said tubes being closed at one end, into which water is fed at the top by pipes C, and are open at the other end, substantially as and for the purpose specified.

3. In a milk-cooler, the tank D, provided with slot or aperture $d$, in combination with a vat, A, provided with a cream-glass, F, and tubes B, extending horizontally and entirely across the vat, said tubes being closed at one end, into which cold water is fed at the top by pipes C, and are open at the other end, and a packing, G, to make the opening or slot $d$ in tank D to the cream-glass water-tight, substantially as and for the purpose specified.

4. In a milk-cooler, the tank D, provided with the opening or slot $d$, and the vat A, provided with the cream-glass F, in combination with a packing, G, between said tank and vat and around the cream-glass, and horizontal tubes B, arranged on either side of the cream-glass and opening into the end of the vat, substantially as and for the purpose specified.

5. In a milk-cooler, the combination, with the tank D, provided with discharge-pipes H at various levels, vat A, provided with horizontal tubes B, open at one end and closed at the other, pipes C adapted to feed cold water into said tubes B at the top, and at the closed ends a packing adapted to separate the water discharged from both tubes B at one end, and a pump, J, or its equivalent, in communication with pipes H, and pipes C, substantially as and for the purpose specified.

In testimony of which invention I hereunto set my hand.

IRA C. WIGHTMAN.

Witnesses:
R. M. HUNTER,
LISLE STOKES.